Patented Dec. 16, 1941

2,266,379

UNITED STATES PATENT OFFICE 2,266,379

EXTREME PRESSURE LUBRICATION

Robert K. Floyd, Detroit, Mich., assignor to Standard Oil Company of California, San Francisco, Calif., a corporation of Delaware No Drawing. Application January 7, 1939, Serial No. 249,727

5 Claims. (Cl. 148—6.5)

This application is a continuation in part of my copending application Serial No. 65,876, filed February 26, 1936.

The invention herein disclosed relates to lubrication, particularly to the lubrication of machine parts wherein high rubbing speeds, high unit pressures, and the like, require lubricants of more than ordinary capabilities. The lubrication of such machine parts is spoken of as "extreme pressure lubrication."

For a number of years past a great deal of effort and experimentation have been devoted to problems concerning scoring, or other failure, of the contacting surfaces of metallic bodies, such as gears, friction or antifriction elements, cutting elements, drawing dies, and the like, resulting from extreme high unit pressures or loads imposed thereon under modern practice, and particularly has this failure been encountered in connection with automobile gear sets.

Many expedients have been devised in an effort to overcome this failure, primarily being confined to improvements in the lubricant itself. For example, it is known to engineers and chemists, that ordinary untreated mineral lubricating oil, while entirely satisfactory under ordinary conditions, for convenience, called a first zone of progressive loading, fails to give proper lubrication in a second or intermediate zone of progressive loading. Under conditions in the second zone, or the zone of mild overload, the problem is adequately met by the addition of saponifiable oil to ordinary mineral oil, but this lubricant fails to protect the gear surfaces when they encounter conditions in a third or extreme pressure zone. In the extreme pressure zone, chemical activity is required to prevent failure, and lubricants containing sulphur or chlorine, or both, are being used, and more or less adequately take care of extreme pressure conditions, but are frequently unsatisfactory because of undesirable chemical activity in zones one and two.

Finally a mineral lubricant, now widely known and used, appeared upon the market, and this lubricant contains chemical substances, primarily sulphur, combined in such form that chemical activity is substantially entirely absent in zones one and two, but under heat and pressure encountered in zone three, chemical activity occurs, and results in the gradual formation of a protective chemical coating upon the gear surfaces, which prevents scoring, or other failure. This latter lubricant, inert in zones one and two, and chemically active only under high heat and pressure encountered in zone three, has proved much more satisfactory than those which are chemically active in all zones.

It is a fact, however, that practically all equipments, especially automobiles, are normally operated within zones one and two, especially during the so-called break-in period, and since the extreme pressure chemico-activated lubricant, above mentioned, is inert in zones one and two, and only gradually forms the protective coating by subjection for appreciable periods to conditions encountered in zone three, there is a time, particularly during the break-in period, in which the gears are partially or wholly unprotected by such formation and are extremely susceptible to irremediable damage.

It is an important object of my invention, therefore, to provide means for protecting gear surfaces, and the like, against injury under extreme pressure conditions, particularly at a time when they are unprotected by lubricant used in connection therewith, and wherein such means also cooperate with, and augment, the protective function of an extreme pressure chemico-activated lubricant, such as that last above mentioned.

An important object of my invention is the treatment of the force transmitting surfaces of machine parts, prior to their use, in such a manner as to form upon said force transmitting surfaces a coating capable of enhancing the effectiveness of a subsequently applied lubricant.

In carrying out my invention, I treat the metallic body, which may be a gear, or gears, friction or antifriction elements, cutting tools, drawing dies, pistons, piston rings, cylinder walls, or other ferrous metallic body or body having a ferrous metallic surface through which force will be transmitted or which will act as a rolling, sliding, or rubbing contact surface, prior to use as a force transmitting surface in the presence of a lubricant, by preforming upon the contacting faces thereof, or over all, including the contact faces, if desired, a layer or surface compound of chemically altered material, having properties which assist in the subsequent lubrication of these contacting faces, particularly under conditions of extreme pressure. These surface layers, produced by the reaction of reagents, hereinafter named, upon the ferrous material of the contact faces, may be or may include ferrous or ferric compounds resulting from such reaction. As will be later pointed out, the preferred form of layer is one resulting from reaction with a reagent containing active sulphur, active chlorine, or an active compound of phosphorus.

It is to be noted that the formation of such layer is carried out upon contacting surfaces which have been previously ground, machined, or otherwise finished to final form. That is, the material treated is ready for final assembly in the usual procedure now current, and the treatment is not to be considered as one of preparing for assembly, but one of preparing for better lubrication after assembly.

In treating a metallic element composed of, or having a surface of, iron or steel, to form one variety of the various protective layers to which I have reference, the element is immersed in, or otherwise subjected to, the action of a bath which may comprise a dilute aqueous solution of ordinary phosphoric acid, in which a quantity of iron filings, or ferrous phosphate, has been dissolved, and in some cases I may add a quantity of manganese phosphate. During treatment of the metallic element the bath solution is preferably maintained at a temperature of approximately 210° Fahrenheit. The proportions of the phosphoric acid, ferrous sulphate and manganese phosphate, may vary over a considerable range, but I have found that four fluid ounces of phosphoric acid, one ounce of iron filings, and a like quantity of manganese phosphate, dissolved in about one hundred and sixty fluid ounces of water, produces a satisfactory result.

The treatment is continued until the required deposit or protective layer is formed thereon, after which the metallic element is removed from the bath. The deposit, layer, or film, thus produced upon the surface of the element comprises normal ferric and/or ferrous, and manganese, phosphates of iron.

I may use a slightly different solution comprising water in which ferrous phosphate and manganese phosphate have been dissolved, the solution including enough ferrous phosphate and water as to produce a dilute solution which exhibits strong phosphoric acidity, enough manganese phosphate being added to control the relation between the ferric and ferrous phosphates. The deposit in this instance comprises ferrous, ferric, and manganese phosphates or iron on the surface of the metallic body.

Deposits or coatings of other types may be formed by other reagents. For example a useful coating or protective layer of the kind described can be formed by subjecting the ferrous surface to the action of some material containing active sulphur or chlorine. A convenient reagent to use for the formation of a protective layer by the action of sulphur is a composition of the type of an extreme pressure lubricant, for example one composed of mineral oil with which there has been admixed some ingredient containing active sulphur, such as, for example, sulphurized sperm oil. Such lubricant materials are widely known. The material to be treated may be immersed in such a liquid for a period of time at an elevated temperature, for example for half an hour at a temperature of from 200 to 300° F. or even somewhat higher. At the conclusion of such treatment, if the treated piece be cleaned and examined, a perceptible film will be found to have formed thereon. If test pieces so treated are then subjected to test in comparison with untreated specimens, as in the "Floyd machine" or "Almen pin test" (which are tests wherein a pin is rotated in a bearing under load to test lubrication) they will be found to be able to bear substantially increased loads before failure, even when lubricated with an ordinary (not an extreme pressure) lubricant. Similar treatment with an extreme pressure lubricant comprising mineral oil and an active chlorine constituent, such as certain chlorinated hydrocarbons, will be found to give similar results.

Consequently, it will be clear that this invention contemplates pretreatment of frictional surfaces which are to be lubricated with ordinary lubricants after assembly, as well as pretreatment of frictional surfaces which are to be lubricated, after assembly, by "extreme pressure" lubricants containing activating extreme pressure characterizing ingredients.

It has been found that not only are the above agents effective for the production of protective films, but that hydra-acids such as hydrogen sulphide, and the halogen hydraacids as hydrochloric, hydrofluoric, hydrobromic and hydriodic acid are useful. These, and sulphuric or selenic acid, or salts of any of them, when combined in proper solutions reactive with iron, or otherwise reacted with the ferrous surface, produce films or layers upon the contacting surface of the metallic body, and these films or layers give good results in preventing failure under extreme pressure conditions. Due to practical difficulties in the production of many such films they are less favored than the films produced by agencies utilizing sulphur, chlorine, or phosphorus.

All of the reagents herein described are reagents corrosive to ferrous surfaces, and the protective film forming reaction may be accurately described as a mild corrosion under controlled conditions.

The preferred group of reagents, viz., those utilizing sulphur, chlorine, and phosphorus, make use of those elements which are generally preferred for use in some form as the "active" constituents of conventional extreme pressure lubricants. However, it appears that it is not necessary that the pretreatment utilize the element in the same or an analogous form to that in which it is used in a later applied extreme pressure lubricant. It does happen that with sulphur and chlorine it is quite convenient to use the same form for both purposes. With phosphorus, the pretreatment is most conveniently carried out with an aqueous solution containing phosphoric acid, while when phosphorus is present in an extreme pressure lubricant it is usually in the form of an organic phosphate or phosphite.

I am aware that it is already known to form coatings of iron-phosphorus compounds and of iron-sulphur compounds upon various metal articles to prevent rusting. Such coatings have not however been formed upon contact surfaces, such as the faces of gear teeth, or the like, or if formed, have been removed before putting in service. So far as I am aware, it is entirely novel to form such coatings upon contact surfaces, and to leave them on such surfaces when the equipment goes into service, for the purpose of enhancing the capability of performance of a subsequently applied lubricant.

It is my belief that it is entirely novel to subject parts such as gears for automotive use and the like to a chemical pretreatment before assembly for the purpose of forming upon the force transmitting surfaces of such gears a coating whose nature is such as to permit use of a relatively mild extreme pressure lubricant during the break-in period, the normal practise having been to use a powerful extreme pressure lubricant during break-in, followed by a milder type of lubricant for regular service.

In one respect this invention acts to extend the functions of highly competent extreme pressure lubricant activating ingredients into fields not heretofore reached by them, as for example, in the lubrication of parts where the durations or intensity of the loading has not been sufficient to fall wholly within the third zone heretofore spoken of and has so deprived the lubricant of opportunity to set up the protective coating actually needed for conditions. In such cases, the pretreatment herein described permits full utilization of the capabilities of an appropriate lubricant.

I claim:

1. A process of preparing a ferrous metal bearing surface for use with extreme pressure lubricants comprising chemically treating said surface with an aqueous phosphate solution which will react therewith to form a coating of iron phosphate thereon.

2. A process of preparing a ferrous metal bearing surface for use with a mineral lubricating oil comprising chemically treating said surface with an aqueous phosphate solution which will react therewith to form a coating of iron phosphate thereon.

3. The process of preventing scuffing and scoring of a ferrous metal bearing surface under extreme pressure comprising pretreating said surface after machining to final dimensions but prior to use with an aqueous phosphate solution which will react therewith to form a coating of iron phosphate thereon forming a lubricating film, lubricating said surface with a mineral lubricant, and subjecting said surface to frictional contact under extreme pressure.

4. A product characterized by formation in accordance with the method, as defined in claim 3.

5. A process of preventing scuffing and scoring of a bearing surface on a machine element having a ferrous metal frictional surface machined to final dimensions and normally subjected to lubrication with a mineral lubricating oil under service conditions ordinarily tending to cause scuffing and scoring of said frictional surface, said process comprising chemically treating said ferrous metal frictional surface with an aqueous phosphate solution containing phosphoric acid which will react therewith to form on said surface a coating substantially of iron phosphate.

ROBERT K. FLOYD.